United States Patent [19]
Yokoyama

[11] Patent Number: 5,937,962
[45] Date of Patent: Aug. 17, 1999

[54] BICYCLE WITH ASSIST ENGINE

[75] Inventor: Yoshiharu Yokoyama, Iwata, Japan

[73] Assignee: Yamaha Hatsudoki Kabushiki Kaisha, Shizuoka-ken, Japan

[21] Appl. No.: 08/692,876

[22] Filed: Aug. 2, 1996

[51] Int. Cl.[6] ..................................................... B62K 11/00
[52] U.S. Cl. ........................................... 180/205; 180/206
[58] Field of Search .................................... 180/205, 206, 180/207, 230, DIG. 907

[56] References Cited

U.S. PATENT DOCUMENTS

| | | | |
|---|---|---|---|
| 2,779,322 | 1/1957 | Gilardi | 180/205 |
| 3,280,932 | 10/1966 | Moulton | 180/205 |
| 3,939,932 | 2/1976 | Rosen | 180/206 |
| 4,026,374 | 5/1977 | Miura . | |
| 4,026,375 | 5/1977 | Miura . | |
| 4,301,885 | 11/1981 | Kostron | 180/205 |
| 4,721,177 | 1/1988 | Qizhen | 180/205 |
| 4,955,627 | 9/1990 | Hartmann | 280/260 |
| 5,024,286 | 6/1991 | Lean et al. | 180/206 |
| 5,433,284 | 7/1995 | Chou | 180/205 |

FOREIGN PATENT DOCUMENTS

| | | |
|---|---|---|
| 636538 | 2/1995 | European Pat. Off. . |
| 2532607 | 3/1984 | France . |
| 8908579 | 9/1989 | WIPO . |

*Primary Examiner*—Daniel G. DePumpo
*Attorney, Agent, or Firm*—Knobbe, Martens, Olson & Bear LLP

[57] ABSTRACT

A gasoline engine power assisted pedal operated vehicle. The amount of assist provided by the engine is varied in response to variations in the manual force applied by the operator to the pedal mechanism. However, in order to provide smoother power assist, rapid changes in manual power application and, specifically, rapid reductions are dampened in the engine response. In addition, the system includes a disabling device for disabling the connection between the engine and the vehicle propulsion system if the vehicle brakes are actuated.

6 Claims, 9 Drawing Sheets

BICYCLE WITH ASSIST ENGINE

BACKGROUND OF THE INVENTION

This invention relates to a manually powered vehicle and more particularly to a manually powered vehicle such as a bicycle with an assist engine for assisting in the operation of the vehicle.

A wide variety of vehicles have been proposed which are designed to be primarily powered by manual power input of the rider. In order to expand the use of these types of vehicles, it has also been proposed to provide various forms of power assist. These power-assist devices incorporate a prime mover, such as an electric motor or an internal combustion engine, which can be operated so as to assist in the manual propulsion of the vehicle. One very successful power-assisted vehicle of this type employs a sensor that senses the actual manual force input by the operator, and then operates the prime mover so as to provide an assist force that is proportional to the manual force.

The advantage of this type of system is that the rider still maintains a "feel" in operating the vehicle. That is, the operator's manual input of force is necessary in order to have the vehicle propelled, and thus the exercise value of the manual propulsion system is maintained. By utilizing the power assist, this type of vehicle can be utilized by persons of varying physical capabilities. Also there is less need to govern the speed of the vehicle since the operator must always input a force to have any power assist.

With these types of power-assist mechanisms, the device generally utilizes a form of force sensor which senses the actual manual force input by the operator. This manual input force is then utilized to provide a control signal for controlling the appropriate amount of assist by the prime mover.

However, many of these types of vehicles are operated by mechanisms wherein the operator input is not constant. For example, many vehicles of this type utilize a pedal-operated crank mechanism for their manual input. Because of the angular relationship of the crank mechanism, the actual force varies cyclically during a single revolution. Thus, the power assist will also vary cyclically in the same manner.

This presents a particular problem when the prime mover is an internal combustion engine. If the engine output is varied cyclically along with the manual force, then because of the inherent uneven characteristics and quick response of internal combustion engines, a jerky operation will result.

It is, therefore, a principal object of this invention to provide an improved power-assisted vehicle that employs a powering internal combustion engine.

It is a further object of this invention to provide an improved internal combustion engine power-assisted vehicle wherein the power assist is proportional to the manual force input, but a smoothing of the applied power assist is accomplished to avoid jerky operation.

In addition to the problem of the cyclically varying manual input, these types of vehicles also employ brake systems for retarding the forward motion of the vehicle. There may be times when the brake is applied, and also some force may nevertheless be applied to the pedals. For example, the operator may be holding the vehicle stationary, but nevertheless may apply some force to the pedals. Since the force-sensing mechanism will sense an output, then the power assist may energize the engine and undesirable results may occur.

It is, therefore, a still further object of this invention to provide a power-assisted vehicle wherein the application of power assist can be totally disabled when the brake is applied.

It is a further object of this invention to provide an internal combustion engine-assisted manually operated vehicle wherein the relationship between the power assist and the operator force can be altered to suit certain conditions.

SUMMARY OF THE INVENTION

This invention is adapted to be embodied in an engine assisted, manually powered vehicle. The vehicle comprises a body assembly that is adapted to accommodate at least one rider. A propulsion device is provided for propelling the vehicle. A manual operator receives manual force inputted from the rider for driving the propulsion device. The manual operator is configured such that the force applied by the rider varies cyclically during a force application mode by the operator from a minimum value to a maximum value and back to a minimum value. An internal combustion engine is also provided for the vehicle. The internal combustion engine is coupled to the propulsion device for driving the propulsion device. The engine has a control for varying the output of the engine. A force sensor senses the force applied by the rider to the manual operator and outputs a control signal. A drive coupling couples the output from the force sensor to the engine control for providing an engine assist to the manual operator of the propulsion device in response to the degree of manual force applied. Means are provided for selectively modifying the connection between the force sensor output and the engine control for effecting changes in the amount of engine assist applied to the propulsion device.

In accordance with one feature of the invention, the modification of the connection between the force sensor output and the engine control reduces the change in rate of engine control in response to a rapid change in the force output from the sensor.

In accordance with another feature of the invention, the vehicle is also provided with a manually operated brake. The coupling between the force sensor output and the engine control is disconnected when the brake is actuated for precluding engine assist when the brake is applied.

DETAILED DESCRIPTION OF THE PREFERRED EMBODIMENTS OF THE INVENTION

Figure 1:
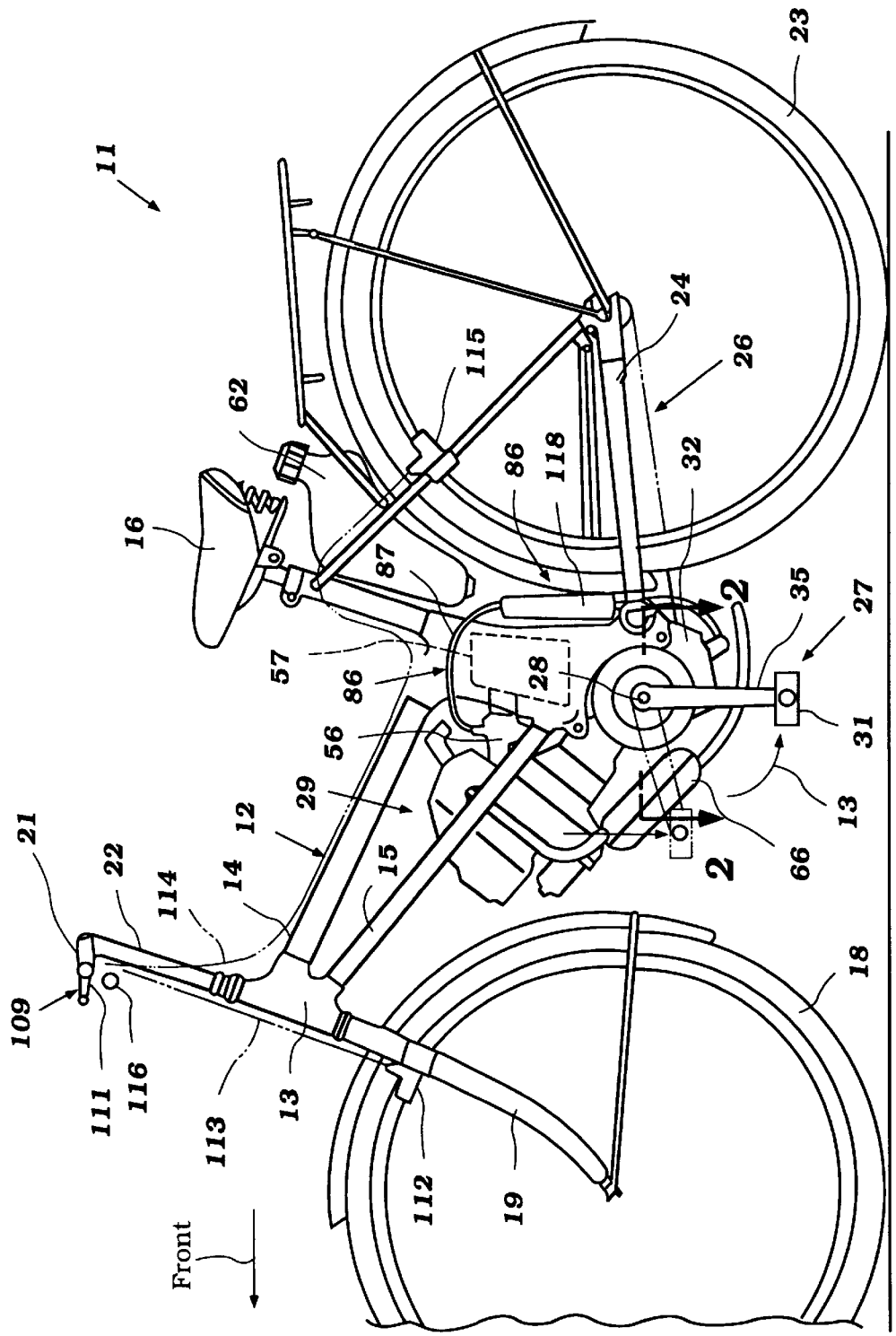
FIG. 1 is a side elevational view of a bicycle constructed in accordance with an embodiment of the invention.

Referring now in detail to the drawings, and initially to FIG. 1, a manually powered vehicle embodying the invention is identified generally by the reference numeral 11. As will become apparent to those skilled in the art, the invention may be utilized with a wide variety of types of vehicles which are primarily manually powered. Bicycles are a typical vehicle of this type, and therefore the vehicle 11 depicted is a bicycle. Although the invention is described in conjunction with a land vehicle of this type, it will be readily apparent to those skilled in the art how the invention can be applied to a wide variety of other types of vehicles, including watercraft.

The bicycle 11 is comprised of a body assembly, indicated generally by the reference numeral 12, and which is primarily a frame assembly. This body assembly or frame is comprised of a head pipe 13, main frame member 14, and down tube 15, which are all connected to each other in an appropriate manner. A seat 16 is adjustably supported by a seat post on a seat pillar 17 that is connected in an appropriate manner to the rear portion of the frame tubes 14 and 15. This seat 16 is adapted to accommodate a rider in a well-known manner.

The bicycle 11 includes a front wheel 18 that is rotatably journaled at the lower end of a front fork 19. The front fork 19 is dirigibly supported by the head tube 12 and is steered by a handlebar 21 that is connected through a handlebar post 22 to the upper end of the front fork 19 in a manner which is also well known in this art.

A rear wheel 23 is rotatably journaled at the end of a trailing arm 24, which is, in turn, connected to the frame assembly 12 at the lower end of the seat pillar 17 in a known manner. A back stay 25 is interconnected between the trailing arm 24 and the seat pillar 17 for providing rigid support for the rear wheel 23.

The rear wheel 23 has associated with it a sprocket that is driven by a chain 26 in a manner which will be described. The rear wheel 23 is primarily driven by a manually operated pedal device, indicated generally by the reference numeral 27, which includes a pedal crank shaft 28 and which is coupled to the chain 26 in a manner which will be described for manual powering of the bicycle 11.

In addition, a power assist in the form of a prime mover, preferably an internal combustion engine, indicated generally by the reference numeral 29, is also provided for assist powered operation of the bicycle 11 in a manner which also will be described. As will become apparent, the pedal mechanism 27 has associated with it a force or torque detector. This force detector detects the force exerted by the rider on the pedals 31 mounted at the end of the pedal device 27 and controls the motor 29 to provide an assist which generally is related to the manual input power exerted by the rider on the seat 16. There is, however, a control interconnection between the manual force sensor and the control for the engine assist provided by the engine 29 which incorporates the invention and which will be described in more detail later.

Figure 2:
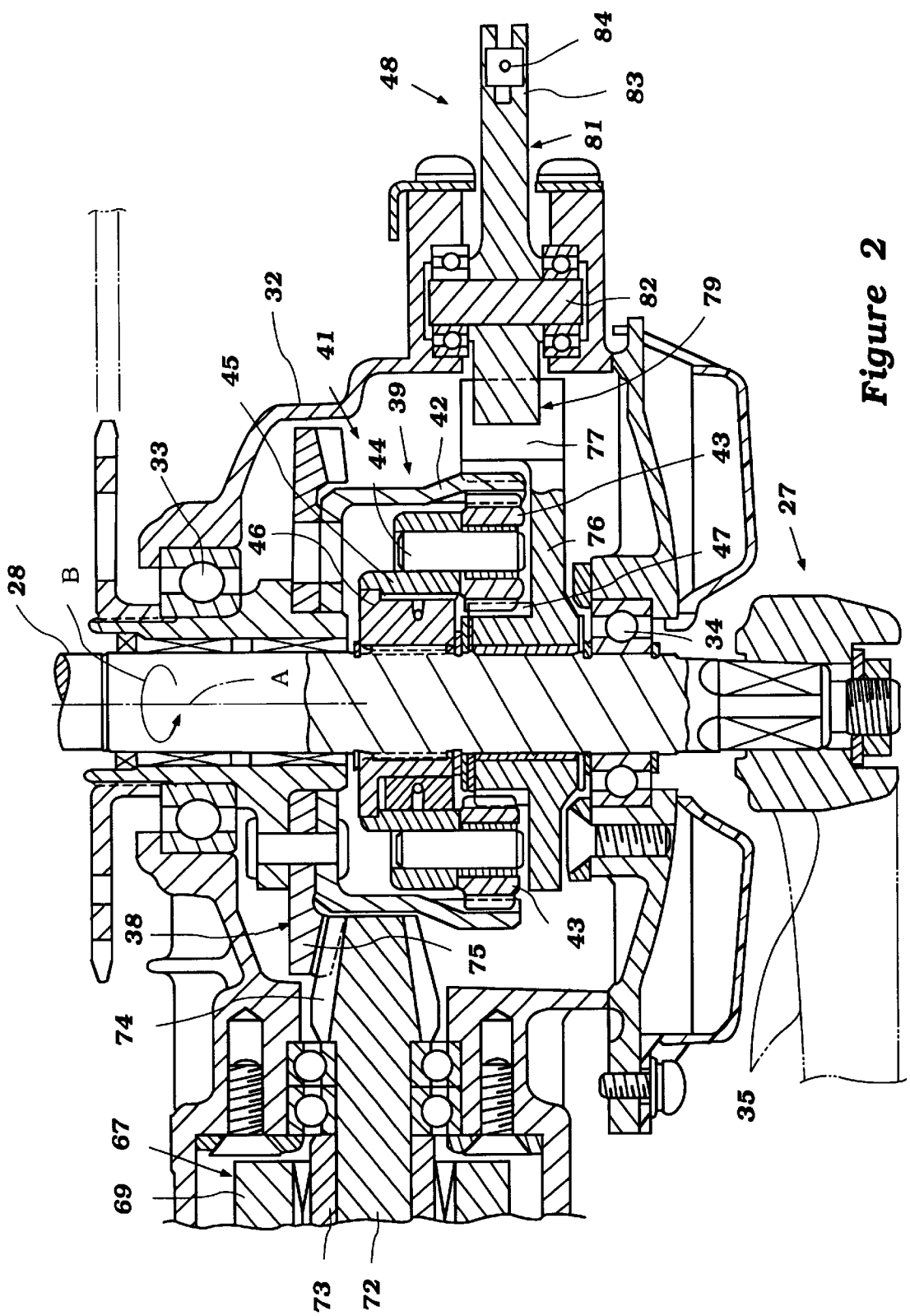
FIG. 2 is an enlarged cross-sectional view taken generally along the line 2—2 of FIG. 1 and shows the connection between the manual drive and the engine power assist for driving the rear wheel.

Referring now in detail primarily to FIG. 2, the manually powered crank assembly 27 is associated with an outer housing assemblage, indicated generally by the reference numeral 32, and which is connected to the frame assembly 12 as thus far described. This housing assembly 32 is positioned at the lower end of the down tube 15 and the seat pillar 17. The crankshaft 28 is journaled therein for rotation by a pair of transversely spaced bearing assemblies 33 and 34. Pedal arms 35 are connected rigidly to the opposite sides of the crankshaft 28 and pivotally carry the pedals 31 at their outer ends.

The crankshaft 28 is connected in a manner to be described to drive a drive sprocket 36, which is journaled on the housing member 32 via a drive sleeve 37. The drive sprocket 36 is engaged with the aforenoted chain 26 for driving the rear wheel 23.

The drive sleeve 37 is affixed to an driving assembly, indicated generally by the reference numeral 38, which forms a portion of a planetary transmission, indicated generally by the reference numeral 39, and which is contained within a gear casing cavity 41 defined by the outer housing 32. The driving assembly 38 is connected to a ring gear 42 of the planetary transmission 39. This ring gear 42 is engaged with a plurality of planet gears 43 that are journaled on stub shafts 44 of a carrier element 45.

The carrier element 45 is connected by means of a one-way clutch 46 to the crankshaft 28 so as to provide a step-up transmission between the rotation of the crankshaft 28 and the rotation of the driving sprocket 36. The one-way clutch 46 only permits drive from the crankshaft 28 about its axis A to the sprocket 36 when the crankshaft 28 is pedaled in the direction indicated at B in FIG. 2. In other words, the drive sprocket 36 can overrun the rotation of the crankshaft 28.

Figure 3:
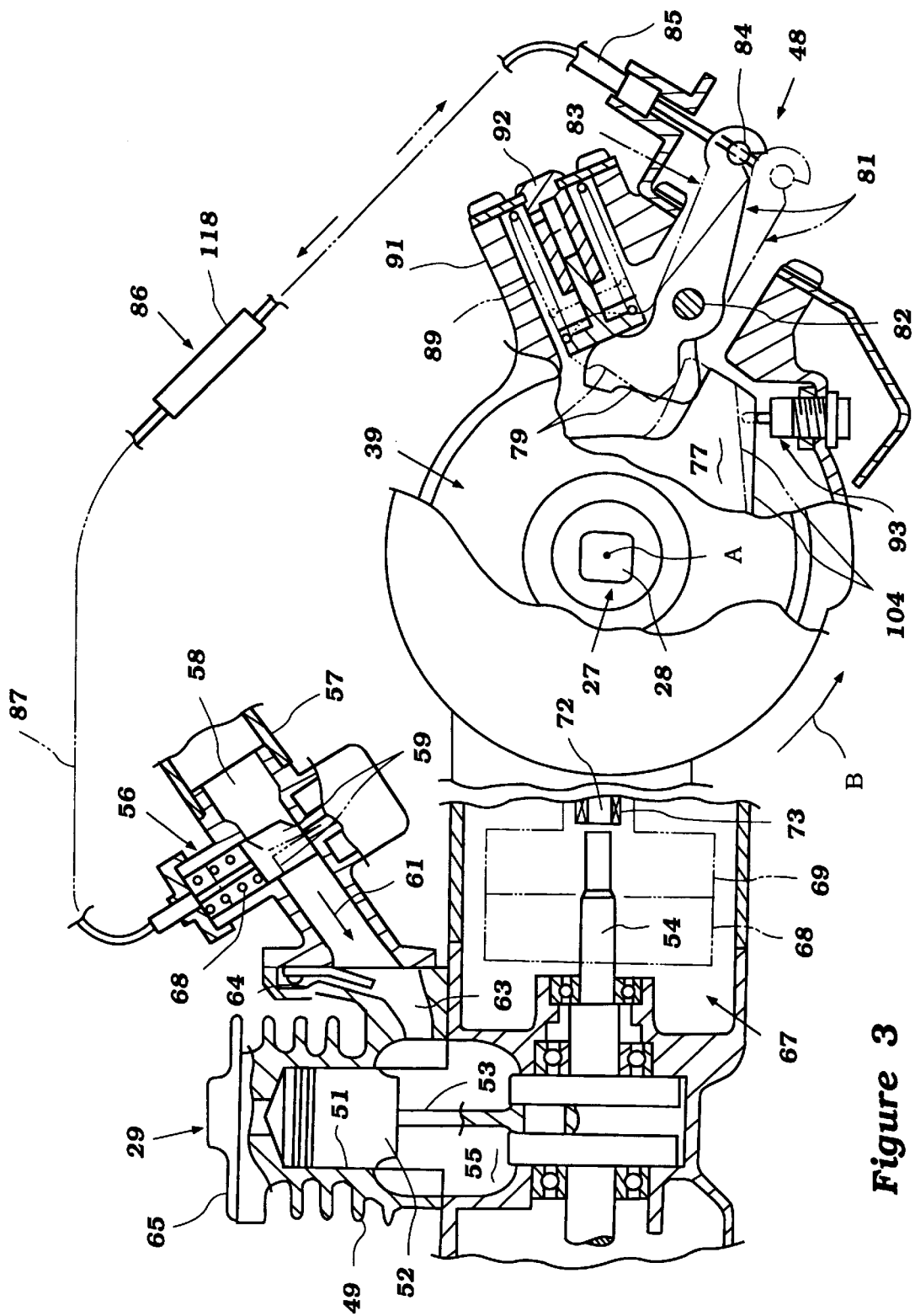
FIG. 3 is an enlarged partially schematic side elevational view looking generally in the same direction as FIG. 1, with portions broken away so as to show the construction of the engine and the cooperation of the force sensor with the engine control.

The planet gears 43 are further engaged with a sun gear 47 which is formed integrally with a portion of a force or torque sensing mechanism, indicated generally by the reference numeral 48, and which has a construction as best seen in FIG. 3. This torque sensing mechanism 48 is utilized so as to measure the torque or manual force exerted by the rider on the pedals 31, or more specifically on the crank operating mechanism 27 so as to control the engine 29 so as to provide power assist in the manner which will be described shortly.

The engine 29 is, in the illustrated embodiment, of a single-cylinder, two-cycle, crankcase compression, spark-ignited type. Although this type of engine is depicted, it will be readily apparent to those skilled in the art that a wide variety of other types of internal combustion engines may be utilized in conjunction with the invention. However, because of their simplicity, the invention has particular utility in conjunction with such two-cycle engines.

The engine 29 includes a cylinder block 49 having a cylinder bore 51 in which a piston 52 reciprocates. The piston 52 is connected by means of a connecting rod 53 to a crankshaft 54 that is rotatably journaled within a crankcase chamber 55 of the engine. The engine 29 is mounted so that the crankshaft 31 rotates about an axis that generally intersects the axis A of the crankshaft 28 of the pedal-operated mechanism 27.

An intake charge, which comprises a fuel-air mixture, is introduced to the crankcase chamber 55 by an induction system that includes a charge former in the form of a carburetor 56. The carburetor 56 draws air from the atmosphere through an air inlet silencer device and filter 57 (shown primarily in FIG. 1) which is mounted to the rear of the engine 29 and beneath the seat pillar 17. This air silencer and inlet device 57 supplies filtered and silenced air to an intake passage 58 of the carburetor 56.

A sliding piston-type throttle valve 59 is slidably supported within the body of the carburetor 56 and is operated in a manner which will be described. This sliding piston 59 also is coupled to a metering rod for controlling the supply of fuel mixed with the incoming air and flowing in the direction indicated by the arrow 61 in FIG. 3 to the crankcase chamber 55. Fuel is supplied to the carburetor 56 from a fuel tank 62 (FIG. 1) that is mounted behind the seat pillar 17 and adjacent the rear wheel 23 in an otherwise unused space of the bicycle 11.

An intake passage 63 is formed in the cylinder block 49, and the flow into this passage is controlled by a reed-type check valve 64, as is well known in this art. The fuel-air charge is then transferred from the crankcase chamber 55 where it is compressed for further compression between the head of the piston 52 and a cylinder head 65 through one or more scavenge passages (not shown). This charge is fired by a spark plug (not shown) and then is discharged to the atmosphere through an exhaust system which includes a muffler 66 FIG. 1).

The engine crankshaft 54 is connected to drive the sprocket 36 in assistance to the manual operation through a transmission, indicated generally by the reference numeral 67 and which is shown best in FIGS. 2 and 3, with reference first to the latter figure. This transmission includes a centrifugal clutch 68 which is driven by the crankshaft 54 and which drives the input of a reducing planetary transmission 69 when the speed of the crankshaft 54 exceeds a predetermined speed.

The output shaft 71 of this planetary transmission 69 is coupled to a pinion shaft 72 through a one-way clutch 73. The one-way clutch 73 permits the planetary transmission output shaft 71 to drive the pinion shaft 72. However, this one-way clutch 73 will not permit pedaling by the operator to crank the engine 29 in the event the engine 29 is stalled or stopped.

Referring now primarily to FIG. 2, the pinion shaft 72 is formed with an integral pinion gear 74. This pinion gear 74 is enmeshed with a ring gear 75 which is affixed to the ring gear 42 of the planetary transmission 39. Hence, the engine 29 can also drive the planetary transmission along with the operation of the pedal-operated crankshaft 28, although the engine 29 cannot drive the crankshaft 28 because of the interpositioning of the one-way clutch 46.

It has been noted that the torque or force sensor 48 is operative so as to control the amount of assist provided by the engine 29 to the manual input of the operator through the manually operated crank mechanism 27. This sensor 48 will now be described by more detail through reference to FIGS. 2–4, and the theory of operation will be described by reference to FIGS. 5 and 6.

It has been noted that the torque sensor 48 employs the sun gear 47. To this end, the sun gear 47 is connected to or formed integrally with a lever arm or disk-shaped member 76 that has an arm portion 77 which extends rearwardly and downwardly. This arm portion 77 has a flattened upper surface 78 that is engaged by the toe portion 79 of a lever 81. The lever 81 is journaled on the housing 32 by means of a pivot pin 82. The lever 81 has a further arm portion 83 that is connected by means of a connector 84 to one end of a wire actuator 85. This type of torque sensor is quite similar to that utilized with electric motor-assisted bicycles as shown in copending application Ser. No. 08/279,908, filed Jul. 25, 1994 and now issued as U.S. Pat. No. 5,570,752 on Nov. 5, 1996.

The wire actuator 85 forms a part of an interconnecting mechanism for connecting the torque sensor 48 with the throttle valve 59 of the carburetor 56. This interconnecting mechanism further includes a disconnect/reconnect device, indicated generally by the reference numeral 86, that cooperates with a further wire actuator 87 for actuating the throttle piston 59 in opposition to the action of a return spring 88. The return spring 88 normally urges the throttle piston 59 to its closed or idle position.

Referring again to FIG. 3, the control lever 81, and specifically its toe portion 79, is urged by a coil compression spring 89 toward engagement with the surface 78. This spring 89 is contained within an integral post 89 of the housing 32. The preload of this spring 89 is controlled by an adjustable stop 92. Hence, the preloading of the spring 89 will determine the force necessary to effect pivotal movement of the actuating lever 81 from its idle position, as shown in solid lines, toward its full thrust position, as shown in phantom lines, as the pedaling torque increases between its low level or zero torque position and the maximum torque position. Thus, as the pedaling torque increases, the wire actuators 85 and 87 operating through the disconnect/reconnect mechanism 86 will move the throttle piston 59 from its idle position to its fill throttle position so as to vary the amount of power assist generated by the motor 29. This power assist is, therefore, generally directly related to the operator input torque.

Figure 5:
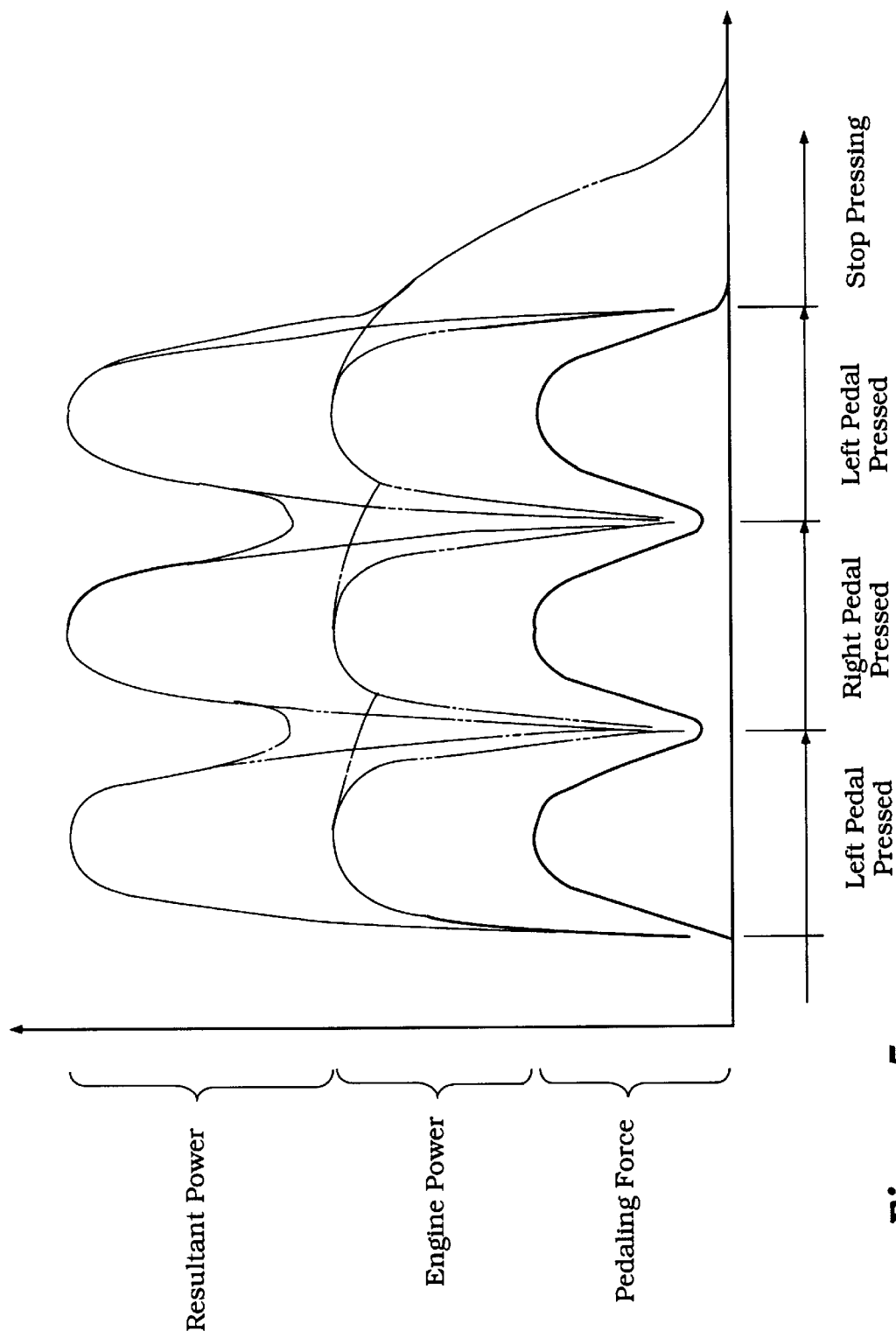
FIG. 5 is a graphical view showing the manual pedaling force, engine power assist, and resulting power, both with and without a feature of the invention.

As may be seen in FIG. 5, the actual force applied to the pedals, or torque exerted on the crankshaft 28, varies cyclically generally in accordance with a sinusoidal wave as the respective pedals are pressed and released. The actual torque will be at a minimum zero position at top and bottom dead centers of each crank arm, and will be at their maximum at the 90-degree position. Thus, without any other change, it will be seen that the engine power assist will generally follow the same curve as shown in the dot-dash lines of FIG. 5, and thus there will be rather severe variations in the actual power applied to the rear wheel 23 during a single crank revolution.

Figure 4:
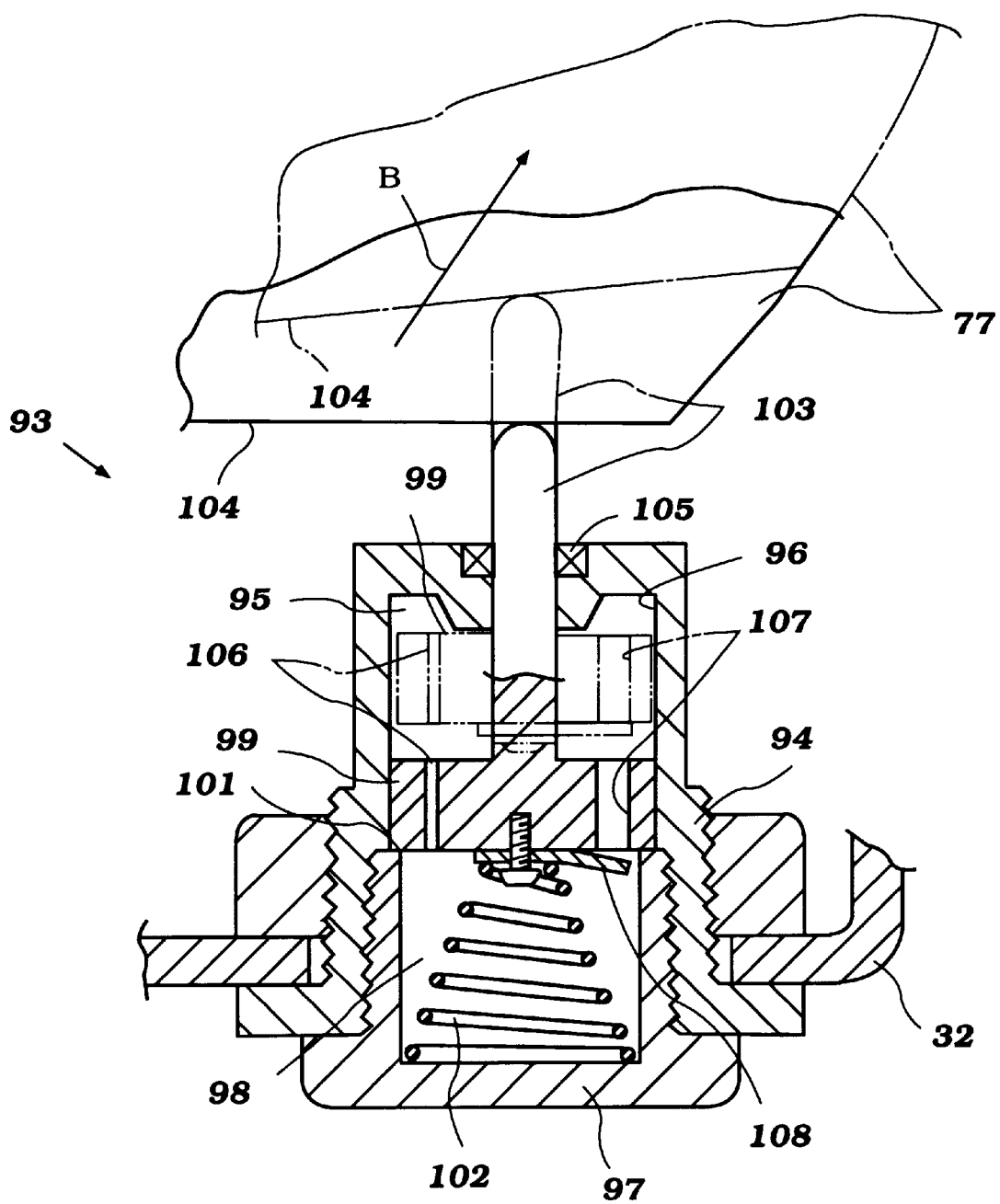
FIG. 4 is an enlarged cross-sectional view showing the portion of the control connection for reducing variations in engine speed during sudden changes in manual power input.

This can give an unacceptable feel to the ride of the bicycle and to the feeling of the operator. Therefore, a damping mechanism, indicated generally by the reference numeral 93 and shown in most detail in FIGS. 3 and 4, is employed so as to reduce the drop off in power assist when the pedal is on its return or up stroke and no significant force is being exerted by the operator. Basically, this damping mechanism 93 operates as a shock absorber and/or dashpot to preclude reverse movement in a direction opposite to the direction indicated at B in FIGS. 3 and 4 when the pedal force falls off to zero or is reduced suddenly.

This mechanism is mounted in the outer housing 32 and includes a first cylindrical member 94 that defines a fluid chamber 95 by means of a bore 96 formed therein. A closure plug 97 closes the end of the chamber 95 and defines a further fluid chamber 98. The chambers 95 and 98 are separated by a piston 99 which is slidably supported in the bore 96 and which is engaged at the bottom end of its stroke with a shoulder 101 formed by an extending portion of the closure plug 98. A coil compression spring 102 is also contained in the chamber 98 so as to urge the piston 99 and a piston rod 103 integrally connected therewith toward engagement with a flattened shoulder surface 104 of the torque sensor member 77. This piston rod 103 extends through a seal 105 so as to provide a fluid-tight seal for the chamber 95.

The piston 99 is formed with a first restricted flow passage 106 that has an orifice diameter which is chosen to provide the desired damping effect. In addition, a larger passage 107 also extends through the piston 99 in parallel relationship to the damping passage 106. A one-way check valve 108 of the reed type is contained within the chamber 98 and controls the flow through the passage 107 so that there can be relatively free flow from the chamber 95 to the chamber 98. However, the valve 108 will close and preclude any reverse flow from the chamber 98 to the chamber 95 through the passage 107.

The solid-line views in FIGS. 3 and 4 show, as previously noted, the position of the torque-sensing member 77 when no force is applied to the pedal mechanism 27. The spring 89 and carburetor return spring 88 will act on the torque member 77 to hold it in this position.

As the operator exerts a force on the pedal mechanism 27, the torque arm 77 will rotate in the direction indicated by the arrow B, and the lever 81 will actuate the throttle valve 59 to open it, as previously described. When this occurs, the flat 104 tends to move away from the plunger extension 103. However, the spring 102 will urge the piston 99 upwardly and force fluid from the chamber 95 to the chamber 98 through the passage 107 upon opening of the check valve 108. This movement can continue until the full-boost position, as shown in the phantom-line views, is reached.

When the pedal force exerted by the operator decreases, the device 93 will, however, preclude a rapid release of the throttle opening. Under this condition the springs 88 and 89 will act to pivot the torque-sensing lever 77 in a direction opposite to that of the arrow B. This exerts a force through the piston rod 103 on the piston 99. Pressure will increase in the chamber 98, and the check valve 108 will close. Hence, downward movement of the piston 99 will be restricted by the flow through the restricted orifice 106. Thus, as seen in FIG. 5, the engine power will not fall off abruptly, but will gradually reduce until the next application of power. As a result, the power assist will vary more gradually than the actual pedal force, giving a better feel to the operator.

Figure 6:
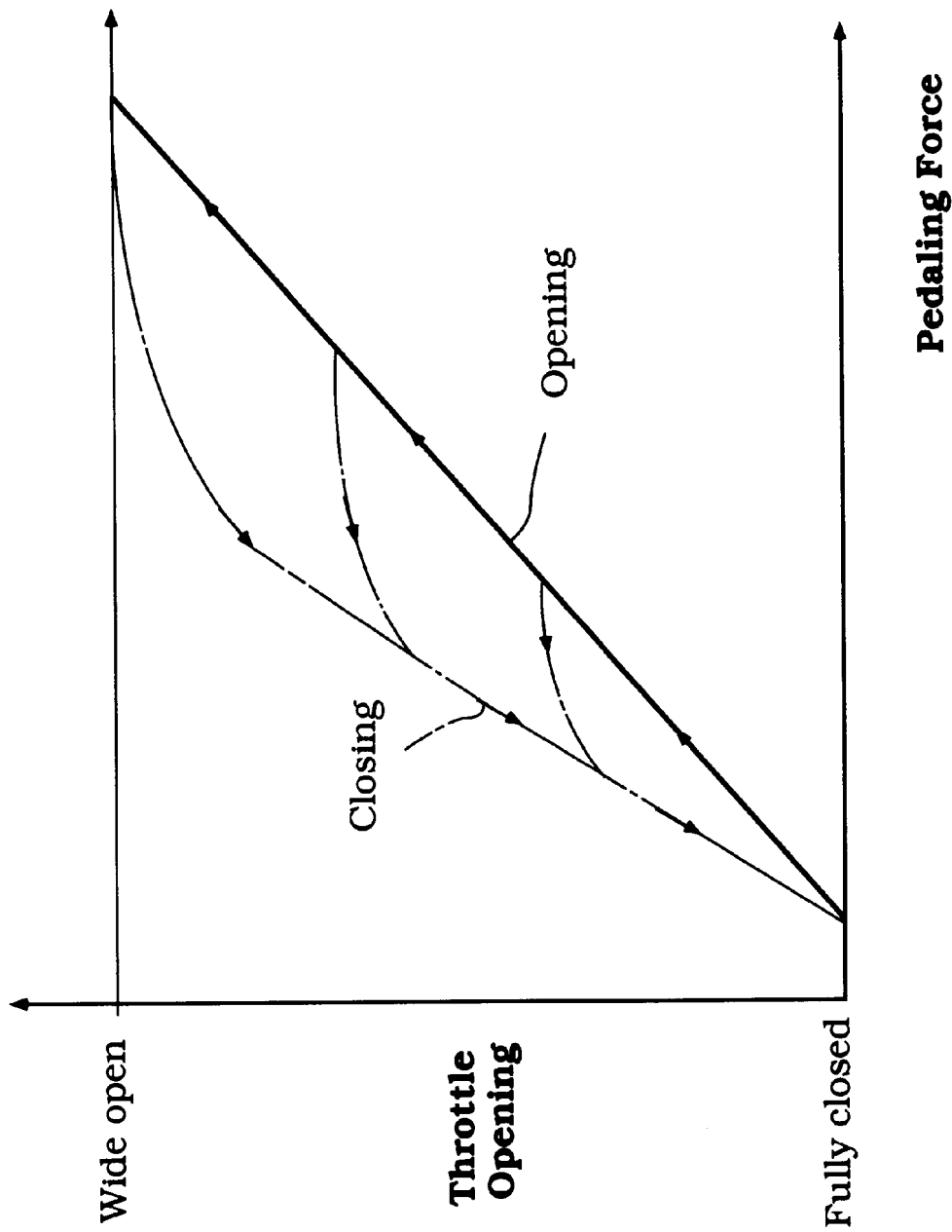
FIG. 6 is a graphical view showing the pedaling force and throttle opening during changes in manual-force application to show how the system operates to minimize fluctuations in power assist upon sudden changes in manual input.

FIG. 6 also shows the type of hysteresis curve that results in that the opening movement occurs linearly, but the closing movement will fall off gradually due to the operation of the damping mechanism 93.

In addition to tailoring the power assist from the motor 29 to the driving of the rear wheel 23 when the pedal pressure falls off due to the cyclic operation, there is also another situation when the power assist may not be necessary or desirable. This occurs when the operator of the bicycle is applying the brakes. The brakes of the bicycle and the interrelationship to the motor assist will now be described first by reference to FIG. 1, wherein the brake system is illustrated.

The handlebar assembly 21 carries a pair of brake levers 109, each of which comprises a respective pivotally supported lever 111. One of these levers 109 operates a front brake 112 through a respective wire actuator 113 so as to brake the rotation of the front wheel 18. The other lever is connected through a wire actuator 114 to a rear wheel brake 115. The operator may operate one or both of the brakes 112 and 115, depending upon whether he wishes to slow the bicycle to make a turn or whether he wishes to hold the bicycle stationary.

In either instance, the operator may apply force to the pedals 31, and the torque sensor 48 will thus normally call for operation of the motor 29 to assist in this manual force. The disconnect/reconnect device 86 is intended and serves the function of precluding engine assist when either or both of the brakes 112 and 115 are actuated.

This mechanism is, in the illustrated embodiment, electrically operated and includes a sensor 116 that senses when either or both of the levers 111 are actuated. This sensor switch 116 cooperates with an electric battery, which is shown schematically in FIGS. 8 and 9 and which is indicated generally by the reference numeral 117. This battery operates the disconnect/reconnect mechanism 86 in a manner which will now be described by particular reference to the three views of FIG. 7 and also later by reference to FIGS. 8 and 9.

The disconnect/reconnect mechanism 86 includes an outer housing 118 that is fixed suitably to the body or frame of the bicycle 11, and this connection may be directly to the housing 32. The first wire actuator 85 has a protective sheath 119 that is fixed to the housing 118, with a wire actuator 121 extending into this housing. This wire actuator 121 is connected by means of a connector 122 to a sliding piston 123 that is slidably supported within a bore 124 of the housing 118. This connection permits the wire actuator 121 to pull the piston 123 to the right, but will not permit any movement of the piston 123 in the opposite direction if the wire actuator 121 moves in the opposite direction.

Figure 7:
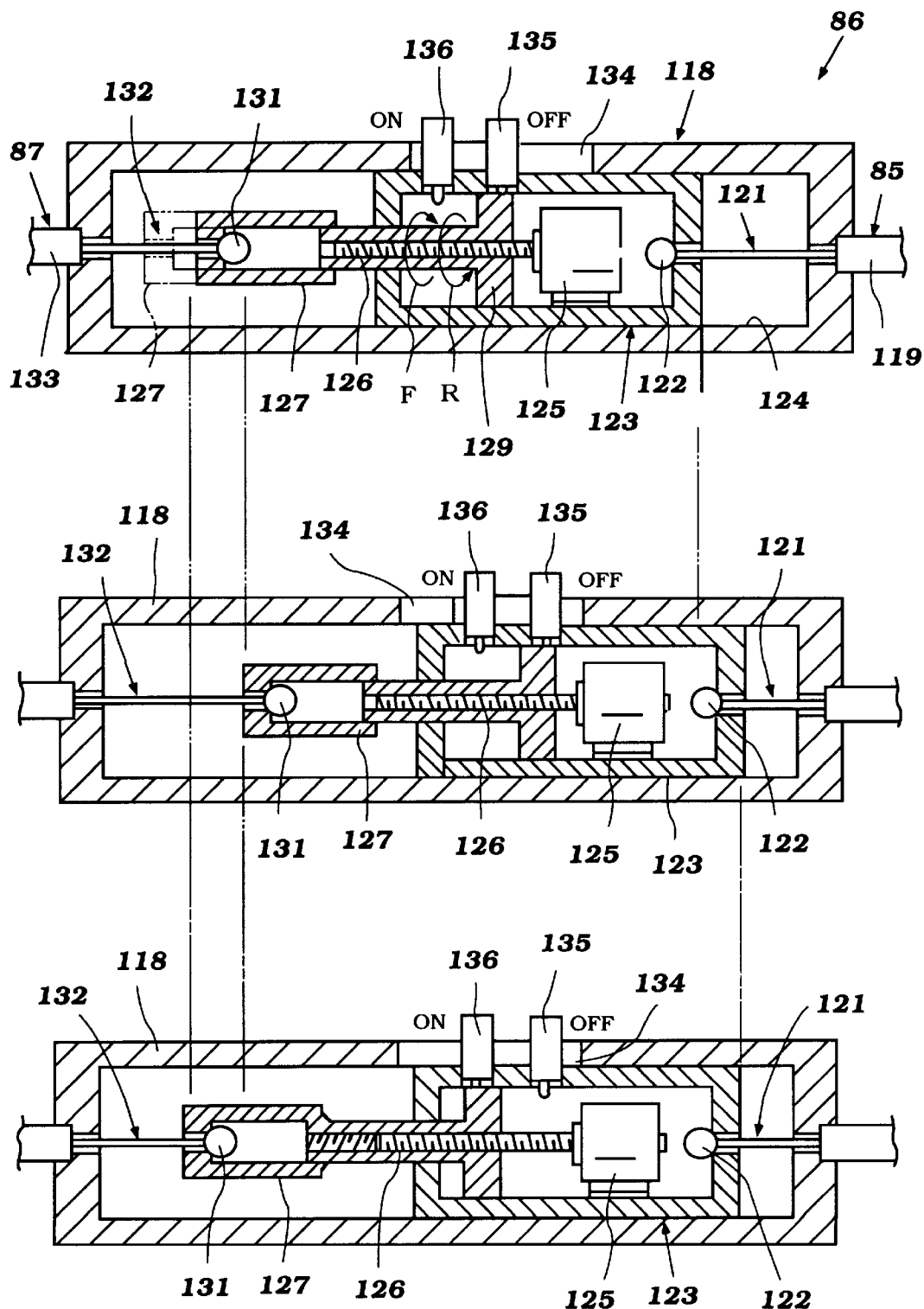
FIG. 7 is a series of cross-sectional views showing how the brake disconnect system operates in controlling the interrelationship between the force sensor and the engine throttle control.
Figure 8:
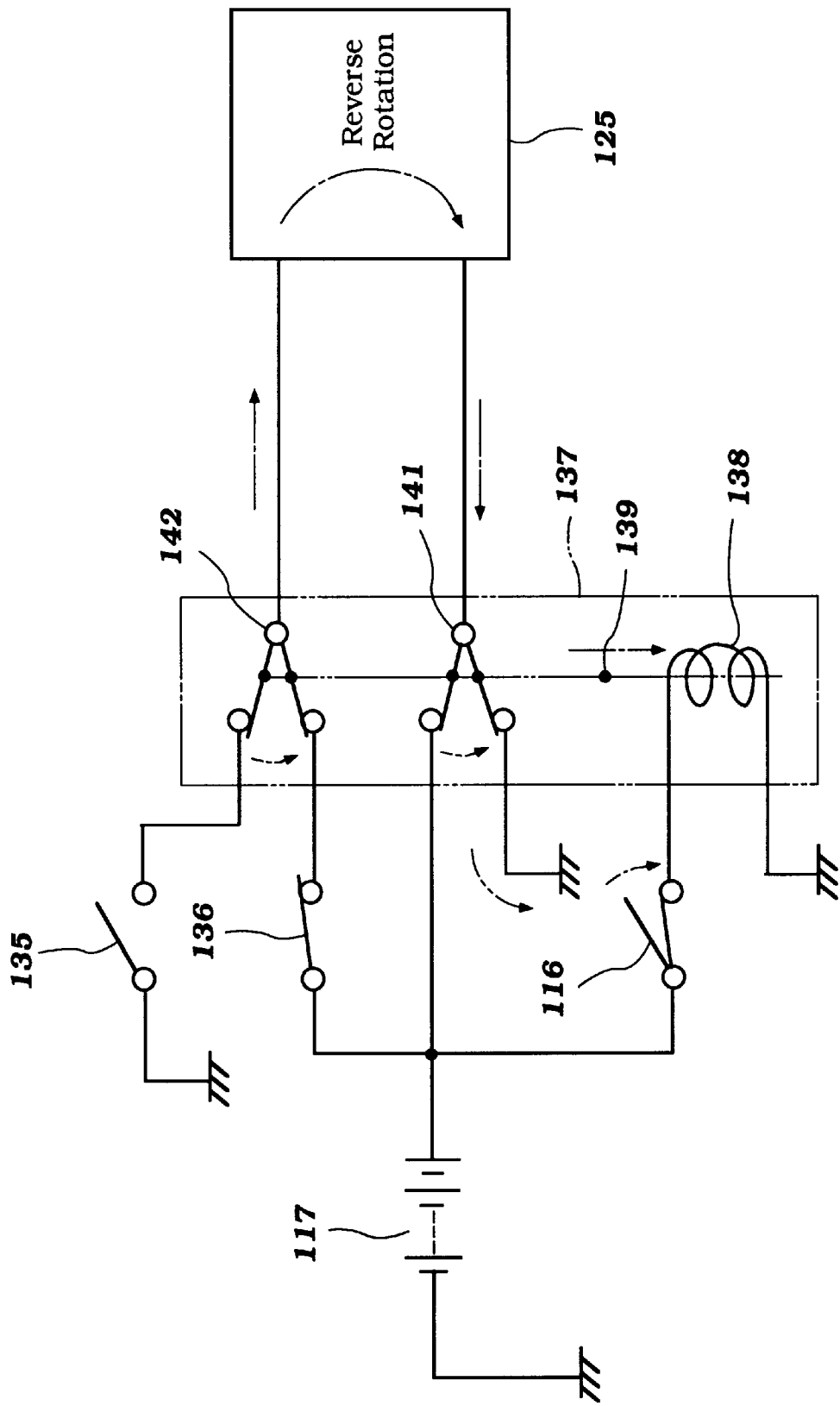
FIGS. 8 and 9 are electrical diagrams showing how the brake disabling interconnection between the force sensor and the engine throttle control operates.
Figure 9:
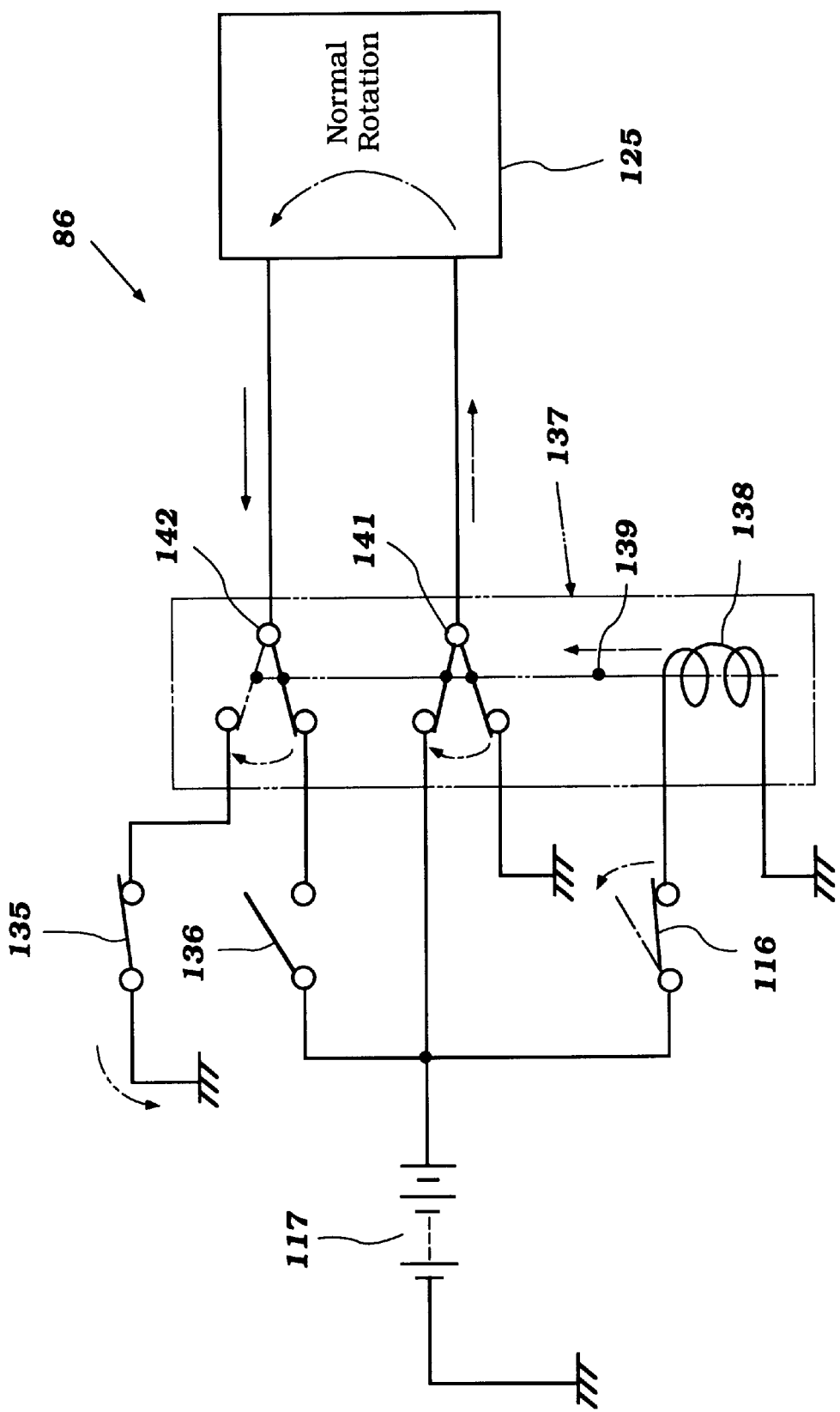

The piston 123 has mounted within it a reversible electric motor 125 that is energized through a circuit, as shown in FIGS. 8 and 9, in response to conditions which will be noted. This motor 125 drives a feed screw 126 in either a forward F direction of rotation or a reverse R direction of rotation, as indicated in FIG. 7. The feed screw 126 has a threaded connection to a follower element 128 which has a headed portion 129 that is received in the member 123 and which is held against rotation relative the member 124, but is free to move axially therealong.

The member 127 has an opening that receives a fastener 131 for connection with the wire actuating element 132 of the wire actuator assembly 87 which is connected at its other end to the throttle piston 59. A protective sheath 133 of this wire actuator 87 is affixed to the housing 118 at one end and to the body of the carburetor 56 at the other end. The connection is such that, when the member 123 is moved to the right, as shown in the Figures, from the closed throttle position, as shown at the top view, to the full throttle position, as shown in the bottom view, the member 127 will follow it and actuate the wire 132 and open the throttle piston 59.

In the condition shown in the top and center views, when the throttle pressure is released, the spring 87 will urge the wire actuator 132 to the left which will draw the housing member 123 and wire actuator 121 in the same direction to return to the figure shown in the upper view. Hence, in this condition the wire actuators 85 and 87 are interconnected for simultaneous operation in both the opening and closing directions as noted.

In order to uncouple this mechanism upon the actuation of either of the brakes 112 or 115, the motor 125 is rotated in the direction F so as to advance the piston 129 and housing member 127 to move from the position shown in the top view to the position shown in the bottom view of this figure. When this rotation occurs, the spring 88 of the carburetor 56 can cause the throttle piston 59 to move to its fully closed position and regardless of the movement of the wire actuator 121, even to its fully opened position under high torque as shown in the bottom view of FIG. 7, no opening of the throttle piston 59 will occur. Thus, the torque sensing device 48 is, in effect, uncoupled from the throttle position 59 under this condition and will not in any way control the position of the throttle piston 59.

The way in which this is accomplished will now be described by primary reference to FIGS. 8 and 9. Before referring to these figures, however, a further discussion of the disconnect/reconnect mechanism 86 shown in FIG. 7 is necessary.

The outer housing 118 is provided with a receptive slot 134 in which two limit switches 135 and 136 are mounted. The limit switches 135 and 136 cooperate with the piston portion 129 of the member 127 so as to provide an indication of the relative position of the member 127 along the feed screw 126. It should be noted that these switches 135 and 136 are carried by the piston 123 and, thus, move along with it. Hence, the switches 135 and 136 indicate the position of the piston 129 relative to the piston 123 and not relative to the outer housing 118.

Referring now to FIGS. 8 and 9, the switches 135 and 136, as well as the brake actuating detecting switch 116, are all connected to a solenoid operated switching mechanism, indicated generally by the reference number 137. This switching mechanism has a solenoid winding or coil 138 which is connected between the battery 117 positive terminal and the ground through the brake switch 116. The solenoid 138 has an armature 139 that is connected to a first switch 141 and a second switch 142. The switches 141 and 142 are connected to the leads for the electric motor 125.

When the switches 141 and 142 are open, as shown in the solid lines of FIG. 9, the electric motor 125 can be energized in a direction so that the contact of the switch 141 is positive and the contact of the switch 142 is negative or grounded so that the motor rotates in the direction F so as to advance follower 127 to the left right and the position shown in the upper views of FIG. 7. On the other hand, when the switches 141 and 142 are open due to movement of the armature 139 upwardly to the position shown in solid lines in FIG. 8, then the motor connection is reversed so that the motor 125 can be rotated in the reverse R direction and return the elements to the position shown in the lower view of FIG. 7. This is, of course, also dependent upon the condition of the switches 135 and 136.

Considering first the condition when the piston 129 is a position to open the switch 135 and the switch 136 is closed, if the brakes applied by closing the switch 116, then the solenoid winding 138 is energized and the current flow operates through the motor 125 to drive it in the reverse direction R so as to cause the piston 129 to advance to the left as shown in FIG. 7 from the position shown in the top and center views to the position shown in the lower view. This movement continues until the switch 136 opens and at which time the switch 135 is then closed.

The switches then move to the position shown in FIG. 9 and, under this condition, the connection between the torque sensor 48 and the carburetor 56 is discontinued and no engine power assist can occur. When the brake is released, however, then the switch 116 will open from the position shown in FIG. 9 from the solid line view to the phantom line view. When this occurs, the spring acting on the armature 139 will cause the switches 141 and 142 to move from the position shown in solid line views to the position shown in phantom line views, and the motor 125 will be energized to rotate in the direction F so as to return the screw follower 127 to the position shown in the top and center line positions at which time the switch 135 will again be open, and the switch 136 closed to return to the position shown in FIG. 8. Thus, actuation of the brake will cause deactivation of the connection between the torque sensor 48 and carburetor 56 so as to effectively disable any engine power assist under the condition when the brakes are applied.

Thus, from the foregoing description, it should be readily apparent that the described power assist system provides good and responsive engine power assist for the manual force and in an amount that is proportional to the manual force, but which is controlled in such a way as to provide smooth power application and smooth running without abrupt changes. In addition, the power assist can be cut off automatically when the brakes are applied so as to avoid unnecessary and unwanted power application. Of course, the foregoing description is that of preferred embodiments of the invention, and various changes and modifications may be made without departing from the spirit and scope of the invention, as defined by the appended claims.

What is claimed is:

1. An engine assisted manually powered vehicle comprised of a body assembly adapted to accommodate at least one rider, a propulsion device for propelling said body, a manual operator for receiving manual force inputted from the rider for driving said propulsion device, a transmission for driving said propulsion device from said manual operator, said manual operator being configured so that the force applied by the rider varies cyclically during a force application mode by the operator from a minimum value to a maximum value and back to a minimum value, an internal combustion engine coupled to transmission for powering said propulsion device for propelling said body assembly, said engine having a control for varying the output of said engine, a force sensor for sensing the force applied by the rider to said manual operator and adapted to control said engine control for varying the power applied by said engine to said propulsion device in relation to the force exerted by the rider on the said manual operator, a drive coupling for coupling said force sensor to said engine control, a brake operator for controlling a brake for braking the movement of said body assembly, and for selectively uncoupling said drive coupling between said force sensor and said engine control upon operation of said brake control.

2. An engine assisted manually powered vehicle as set forth in claim 1, wherein the transmission comprises a planetary transmission.

3. An engine assisted manually powered vehicle as set forth in claim 2, wherein the planetary transmission includes a sun gear supported for limited rotation and the force sensor senses the degree of rotation of said sun gear.

4. An engine assisted manually powered vehicle as set forth in claim 3 further including a shock absorber associated with the sun gear for controlling the rate of rotation of said sun gear in at least one direction for modifying the relationship between the force sensor and the engine control for varying the rate of change in the amount of power assist when said sun gear is rotated in said at least one direction.

5. An engine assisted manually powered vehicle as set forth in claim 4, wherein the rate of rotation of the sun gear is reduced by the shock absorber in the event of a reduction in the manual force output signal.

6. An engine assisted manually powered vehicle as set forth in claim 1, further including a brake control operated by the rider for controlling the braking of the vehicle and wherein the interconnection between the output of the force sensor and the engine control is disconnected in response to the operation of the brake control.

* * * * *

UNITED STATES PATENT AND TRADEMARK OFFICE
CERTIFICATE OF CORRECTION

PATENT NO. : 5,937,962
DATED : August 17, 1999
INVENTOR(S) : Yokoyama

It is certified that error appears in the above-identified patent and that said Letters Patent is hereby corrected as shown below:

Title page,
Insert the following: item [30] Foreign Application Priority Data,
      Aug. 8, 1995    [JP] Japan………………….. 7-22482

Signed and Sealed this

Twenty-sixth Day of February, 2002

Attest:

JAMES E. ROGAN
*Attesting Officer*    *Director of the United States Patent and Trademark Office*